Jan. 20, 1953  A. JESONIS  2,625,741
MACHINE FOR DETERMINING PIPE CONTOURS IN PIPE JOINTS
Filed Aug. 7, 1948
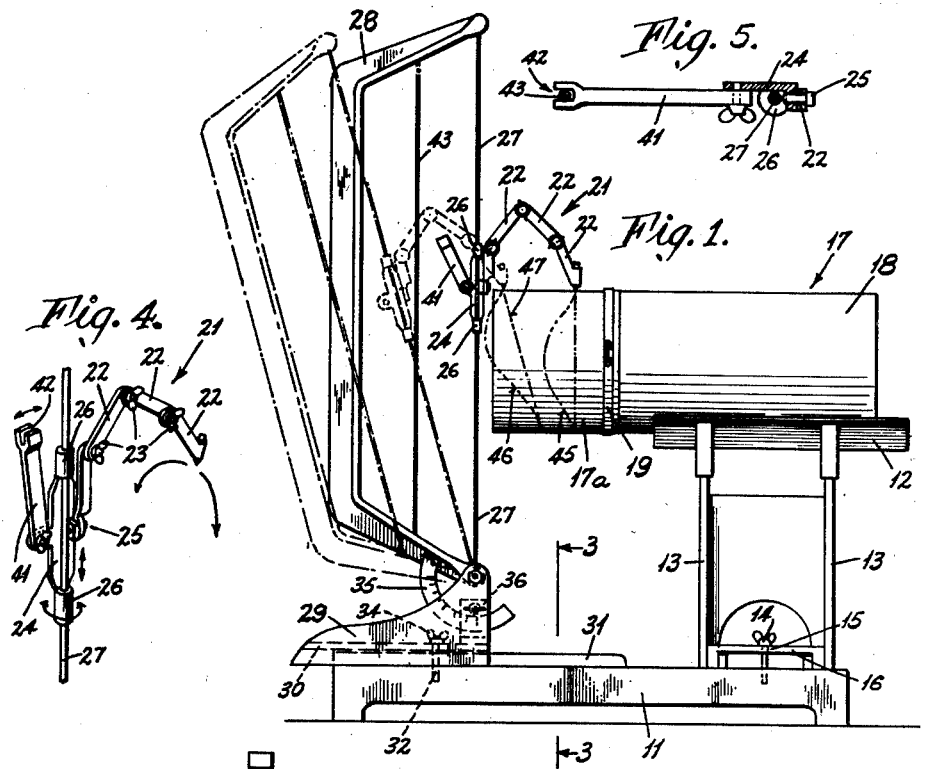
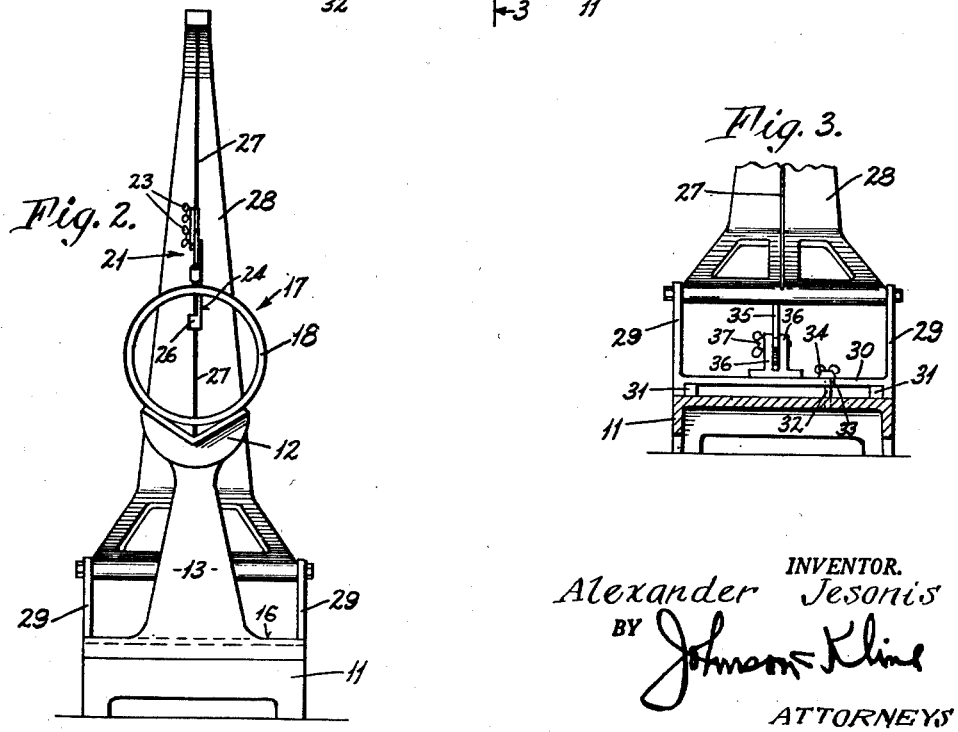
INVENTOR.
Alexander Jesonis
BY
ATTORNEYS Patented Jan. 20, 1953

2,625,741

UNITED STATES PATENT OFFICE 2,625,741

MACHINE FOR DETERMINING PIPE CONTOURS IN PIPE JOINTS

Alexander Jesonis, Stratford, Conn.

Application August 7, 1948, Serial No. 43,047

13 Claims. (Cl. 33—21)

1

This invention relates to machines for use in obtaining the correct contour on a pipe end when making a pipe joint or connection, either between separate pipes or between a pipe and a member having a planar or other shape of surface. For example, when making a joint between separate pipes without resorting to fittings, an opening is cut in the side of the main pipe and the end of the branch pipe is then cut to accurately fit the surface of the main pipe, after which the cut end of the branch pipe is welded to the surface of the main pipe around the opening. Obviously, the contour to be imparted to the end of the branch pipe varies with differences in relative diameters of the two pipes, differences in the angle between them, and degree of offset between their axes.

It should be understood that the expressions "main pipe" and "branch pipe" are used herein for descriptive purposes only and have no limiting effect.

A feature of this invention is the provision of a machine for quickly and accurately indicating the correct contour to be given a pipe end to properly fit it in a pipe joint of substantially any type or arrangement.

To correctly cut a branch pipe end, a template is customarily employed, and the development and laying out of an accurate template is a slow and tedious operation. A further feature of this invention is the provision of a machine for use in quickly and accurately providing a correctly formed template for use in pipe cutting without requiring layout diagrams, calculations, or the like.

A still further feature is the provision of a machine for quickly and accurately marking a workpiece, which may be either a pipe or a template, to accurately show thereon the contour of the pipe end required to fit it to another pipe or other member. Such contour, of course, varies with each different joint, but the present machine is arranged to correctly mark whatever contour may be required in making substantially any form of pipe joint or connection, either between separate pipes or between a pipe and a member having a flat surface.

A further feature is the provision of an improved machine as above described of such simple construction and mode of operation as will permit accurate results being quickly and easily obtained by untrained personnel.

An illustrative embodiment of the invention is hereinafter described, in connection with the accompanying drawing in which—

Figure 1 is a view in elevation of a machine

2 constructed in accordance with one embodiment of this invention;

Fig. 2 is an end elevation looking from the right of Fig. 1;

Fig. 3 is a section on the line 3—3 of Fig. 1;

Fig. 4 is a perspective view of a detail; and

Fig. 5 is a horizontal section through the device shown in Fig. 4.

The present invention provides a machine which is arranged to mark directly upon a workpiece having the form of a pipe to be cut, the exact line or contour which the pipe itself is required to have in order to fit a given point. The workpiece may be the pipe itself, or it may be template material having the shape of such pipe and intended to be used to properly guide the cutting thereof. A marking device is mounted for longitudinal and rotative movement along and about a line opposite the end of the workpiece corresponding to the axis of the main pipe to which the cut pipe end is to be connected, and the marking device is adjustable in accordance with the radius of the main pipe. The angularity of the path along which the device moves is adjustable in accordance with the angularity of the pipe joint. The support for the workpiece is also adjustable in a transverse direction to properly position the workpiece in accordance with the relative positions of the axes of the two pipes, to provide for proper marking of the work when the axes of the pipes in the joint are offset, that is, when they do not lie in the same plane. An arrangement is also provided for indicating the line of cut to be followed when the pipe is to be joined to a flat surface at an angle less than a right angle.

The particular embodiment of the invention which has been chosen for illustration includes a base 11 having a workpiece supporting cradle 12, mounted on uprights 13 slidably supported on the base 11 for transverse adjustment, a clamping bolt and nut 14 being threaded into the base 11 and extending upwardly through a slot 15 formed in a horizontal plate 16 mounted between and movable with the uprights 13.

A workpiece 17 is supported on the cradle and may be either a pipe section or a piece of template material 17a held in the form of the pipe to be cut. In the case of template material, it may, for example, be secured to and project from the end of a piece of pipe which is to be cut, such as the pipe section 18 shown in the drawing. In this case, the template material is secured to the end of the pipe section 18 by a holding strap 19 or any other suitable device.

An adjustable scriber or marking device 21, which is illustrated as formed by a plurality of sections 22 or arms pivoted together and adapted to be secured in adjusted position by wing nuts 23 mounted on the pivotal connections, is supported upon a supporting plate 24 for rotative movement by a supporting pivot 25. The plate is provided with spaced collars 26 slidably engaging an elongated guide 27 in the form of a wire, rod, or the like. The guiding member 27 is located opposite the end of the workpiece 17 in a vertical supporting frame 28 pivotally mounted for angular adjustment between side flanges 29 on a frame-supporting base member 30 mounted for horizontal movement on the base member 11 axially of the workpiece along guide rails 31. The frame-supporting base 30 is secured in adjusted position by a bolt 32 threaded into the base 11 and extending upwardly through a slot 33 in the base 30, a suitable wing nut 34 or the like serving to clamp the frame in adjusted position upon the base.

The supporting frame 28 from the marking device is angularly adjustable on the support, an arcuate arm 35 on the lower part of the frame member being slidably received between spaced clamping jaws 36 adapted to be drawn together upon the arcuate arm by a clamping nut 37 for holding the supporting frame 28 in any angular position relative to the workpiece 17.

The supporting plate 24 for the adjustable marking device has a pivoted arm 41 which is employed when it is desired to mark a workpiece to indicate the line to cut a pipe end for connection to a flat or planar surface. The arm 41 is pivotally connected to the plate 24 and has a slot 42 in its outer end adapted to engage a guide wire, rod, or the like, 43 on the frame 20 which is parallel to the guide wire 27. When the arm 41 is operatively positioned to engage the guide wire 43, as indicated in Fig. 5, it will be apparent that the marking device is held against rotation relative to the guide wire 27, and a straight line will be indicated by spaced points in a plane parallel to the guide wire 27, while when the arm 41 is raised out of engagement with the wire 43, as indicated in Fig. 4, the marking device is rotatable relative to the guide wire 27 as well as movable longitudinally therealong and a scalloped line corresponding to a cylindrical surface will be marked on the workpiece.

In operation, assuming that it is desired to connect a branch pipe to any main pipe in a position at right angles thereto and with their axes in a common plane, a workpiece 17 having the form of a branch pipe to be cut is positioned in the supporting cradle 12 and the latter is centered on the base 11 so that the axis of the workpiece is co-planar with the guide wire 27 which corresponds to the axis of the main pipe. The frame 28 is then positioned on the base 30 at such an angle that the guide wire 27 occupies a position relative to the workpiece corresponding to the axis of the main pipe, for example, a right angle as shown in Fig. 1. The marking device 21 is then adjusted so that it is spaced from the guide wire 27 a distance equal to the radius of the main pipe and is located on a level with the supporting pivot 25, see Fig. 1. Under these conditions, movement of the scriber or marking device 21 around the cylindrical surface of the workpiece 17 will draw a line 45 which exactly indicates the line along which the branch pipe must be cut in order to correctly fit it to the main pipe.

If the branch pipe is to be positioned at an angle to the main pipe, then the frame 28 is adjusted so that the guide wire 27 assumes a position relative to the workpiece 17 which corresponds to the axis of the main pipe to which the branch pipe is to be connected. This is shown, for example, in dotted lines in Fig. 1. Under these circumstances, the marking device will trace a line 46 on the workpiece, the latter being moved to the left in Fig. 1 a distance sufficient to prevent the marking device 21 from running off the end of the material. On the other hand, as above pointed out, if the end of the branch pipe is to be cut along an oblique plane, as is the case when it is to be connected to a member having a flat surface at an angle other than a right angle, then the arm 41 is moved into engagement with the parallel guide wire 43 on the frame 28. This prevents rotation of the marking device supporting plate 24 relative to the guide wire 27, with the result that the pipe can be marked at spaced points to indicate the plane of the cut, and the spaced points then connected by drawing a line 47 around the workpiece. This line will indicate the plane of the surface to which the branch pipe is to be connected.

Any offset between the axis of the two pipes is provided for by transverse adjustment of the cradle 12 on the base 11.

The marking device 21 draws directly upon the workpiece, either a pipe section or template material, the correct line for showing the contour required on the branch pipe end in order to properly fit it to a main pipe. In the case of template material it will be apparent that after marking the material of the template it is cut along the line of the mark to properly form it for template use. When so cut, the template can be used either for directly guiding a cutting operation, or it may be used as a template in guiding the operation of a cutting machine such, for example, as that shown in my co-pending application, Serial No. 4,838, filed January 28, 1948, now United States Patent No. 2,528,147.

It will be apparent that, when the machine is used to mark the correct contour directly on a pipe section, the base 11 and cradle 12 can be eliminated and the marking mechanism supported directly on the pipe section. Such an arrangement would provide a convenient portable device for field use.

Various changes and modifications can be made in the described mechanism without departing from the invention and portions of the improvements can be used without others.

I claim:

1. A machine comprising in combination, means for holding a workpiece having the form of a pipe to be cut, a marking device adjustable in accordance with the radius of a connecting pipe to which the cut pipe is to be joined, a movable support for said marking device, means including an elongate guide member located beyond the end of the workpiece to extend transversely thereof for rotatably and movably mounting said movable support for movement along a line located beyond the end of the workpiece and positioned relatively to the workpiece to coincide with the axis of the connecting pipe, and means for adjustably connecting said marking device to said movable support for marking the entire circumference of the workpiece.

2. A machine for making a pipe-cutting template, means for holding template material in the shape and relative position corresponding to a branch pipe to be cut, a template marking device adjustable in accordance with the radius of the main pipe to which the branch pipe is to be joined, a movable support for said device, means including an elongate guide member located beyond the end of the workpiece to extend transversely thereof for rotatably and movably mounting said movable support for movement along a line located beyond the end of the template material and coinciding with the axis of the main pipe relatively to the template material, and means for adjustably connecting said marking device to said movable support for marking the entire circumference of the template material.

3. A machine for making a template for use in cutting a branch pipe end for connection to a main pipe comprising in combination, means for holding template material in a shape and a relative position corresponding to the branch pipe to be cut, a template marking device adjustable in accordance with the radius of the main pipe, and a movable support for said template marking device mounted for movement during marking along a line located beyond the end of the template material and coinciding with the axis of the main pipe to which the branch pipe end is to be connected.

4. A machine for making a pipe-cutting template comprising in combination, means for holding template material in a shape and a relative position corresponding to a branch pipe to be cut, a template marking device adjustable in accordance with the radius of a main pipe, means for supporting said marking device for movement around said template material during marking thereof, said supporting means being guided during marking along a line coinciding with the axis of the main pipe and located opposite the end of said template material, means for adjusting the position of the line of movement of said supporting means relative to said template material, and means for rotatably connecting said device to said supporting means.

5. A machine for making a pipe-cutting template comprising in combination, means for holding template material in a shape and a relative position corresponding to a branch pipe to be cut, a template marking device adjustable in accordance with the radius of a main pipe, means for supporting said marking device for movement around said template material during marking thereof, said supporting means being guided during marking along a line coinciding with the axis of the main pipe and located opposite the end of said template material, means for adjusting the position of the line of movement of said supporting means relative to said template material, means for rotatably connecting said device to said supporting means, and means for adjusting the position of said template material relative to said line.

6. A machine for making a pipe-shaped template for use in cutting the end of a branch pipe for connection to a main pipe comprising in combination, a cradle for supporting template material to be cut, a template marking device adjustable in accordance with the radius of the main pipe, a mounted support for said device located beyond the end of said template material for movement during marking along and about a line coinciding with the axis of the main pipe, and means supporting said cradle for adjustment in a transverse direction relative to said line.

7. A machine for making a pipe-shaped template for use in cutting the end of a branch pipe for connection to a main pipe comprising in combination, a cradle for supporting template material to be cut, a template marking device adjustable in accordance with the radius of the main pipe, a slidably and rotatably mounted support for said device located beyond the end of said template material for movement during marking along and about a line coinciding with the axis of the main pipe whereby said template marking device may be moved around said template material during marking thereof, means for adjusting the angular relation of said line relative to said template material, and means supporting said cradle for adjustment in a transverse direction relative to said line.

8. A machine for making a pipe-shaped template for use in cutting a branch pipe end for connection to a main pipe comprising in combination, means for supporting template material to be cut, a template marking device adjustable in accordance with the radius of the main pipe, a support for said marking device located beyond the end of said template material for movement along a line corresponding to the axis of the main pipe, including means for varying the angularity of said line of movement of said marking device relatively to said template material and in accordance with the angularity of the finished pipe joint.

9. A marking machine for use in pipe cutting for fitting a workpiece to a main pipe comprising in combination, a marking device adjustable in accordance with a predetermined dimension, means for slidably and rotatably supporting said marking device for movement during marking along and about a line coinciding with the axis of the main pipe and having a predetermined angular relation to the workpiece being marked and located beyond the end of the workpiece, and means for rotatably connecting said marking device to said supporting means.

10. A marking machine for use in pipe cutting for fitting a workpiece to a main pipe comprising in combination, a marking device adjustable in accordance with a predetermined dimension, means for slidably and rotatably supporting said marking device for movement during marking along and about a line coinciding with the axis of the main pipe and having a predetermined angular relation to the workpiece being marked and located beyond the end of the workpiece, means for adjusting said angular relation, and means for rotatably connecting said marking device to said supporting means.

11. A machine for making a template for use in cutting a branch pipe end for connection to a main pipe comprising in combination, means for holding template material in a shape and in a relative position corresponding to the branch pipe to be cut, a template marking device adjustable to correspond to the radius of the main pipe to which the branch pipe is to be joined, a movable and rotatable suport for said marking device mounted for both slidable movement during marking along a line located beyond the end of the template material and positioned with relation to said template material so as to coincide with the axis of the main pipe and for rotation about said line, and means for rotatably connecting said marking device to said movable and rotatable support for circumscribing movement around said template material.

12. A machine comprising in combination, means for holding a workpiece having the form of a pipe to be cut, a marking device adjustable in accordance with the radius of a connecting pipe to which the cut pipe is to be joined, a movable support for said marking device movable during marking along a line located beyond the end of the workpiece and positioned relatively to the workpiece to coincide with the axis of the connecting pipe, restraining means to prevent rotation of said movable support around said line, and means for rotatably connecting said marking device to said movable support for marking the circumference of the workpiece.

13. A machine for making a template for use in pipe cutting, means for holding template material in the shape and relative position corresponding to a branch pipe to be cut, a template marking device adjustable in accordance with the radius of the main pipe to which the branch pipe is to be joined, a movable support for said device movable during marking along a line located beyond the end of the template material and coinciding with the axis of the main pipe relatively to the template material, restraining means to prevent rotation of said movable support around said line, and means for rotatably connecting said marking device to said movable support for marking the circumference of the template material.

ALEXANDER JESONIS.

REFERENCES CITED

The following references are of record in the file of this patent:

UNITED STATES PATENTS

| Number | Name | Date |
| --- | --- | --- |
| 63,123 | Warr | Mar. 19, 1867 |
| 1,698,154 | Day | Jan. 8, 1929 |
| 1,858,077 | Douglass et al. | May 10, 1932 |
| 1,907,956 | Gerber | May 9, 1933 |
| 1,991,117 | Porteous et al. | Feb. 12, 1935 |
| 2,389,286 | Watkins | Nov. 20, 1945 |
| 2,422,338 | Christensen | June 17, 1947 |
| 2,437,025 | Hatton | Mar. 2, 1948 |